(12) United States Patent
Lesseraux

(10) Patent No.: US 10,500,566 B2
(45) Date of Patent: Dec. 10, 2019

(54) DESICCANT AND DEODORIZING DEVICE

(71) Applicant: FAZ TOO, LLC, Houston, TX (US)

(72) Inventor: Ron Lesseraux, Houston, TX (US)

(73) Assignee: FAZ TOO, LLC, Houston, TX (US)

( * ) Notice: Subject to any disclaimer, the term of this patent is extended or adjusted under 35 U.S.C. 154(b) by 60 days.

(21) Appl. No.: 15/914,031

(22) Filed: Mar. 7, 2018

(65) Prior Publication Data

US 2019/0275497 A1 Sep. 12, 2019

(51) Int. Cl.
| | |
|---|---|
| *B01J 20/28* | (2006.01) |
| *B01J 20/10* | (2006.01) |
| *B01J 20/26* | (2006.01) |
| *B01D 53/26* | (2006.01) |
| *B01J 20/04* | (2006.01) |

(52) U.S. Cl.
CPC ........ *B01J 20/2805* (2013.01); *B01D 53/263* (2013.01); *B01J 20/043* (2013.01); *B01J 20/103* (2013.01); *B01J 20/261* (2013.01); *B01J 2220/68* (2013.01)

(58) Field of Classification Search
CPC .... B01J 20/2805; B01J 53/263; B01J 20/043; B01J 20/103; B01J 20/261; B01J 2200/68
USPC ............................................................ 34/60
See application file for complete search history.

(56) References Cited

U.S. PATENT DOCUMENTS

| | | | |
|---|---|---|---|
| 5,773,105 A | 6/1998 | Klett | |
| 5,907,908 A * | 6/1999 | Cunanan | B01D 53/263 34/61 |
| 6,217,701 B1 * | 4/2001 | Shelley | B32B 1/06 156/308.4 |
| 6,378,224 B1 | 4/2002 | Qualkinbush et al. | |
| 6,893,632 B2 * | 5/2005 | Johnson | A01M 31/008 424/400 |
| 7,615,269 B2 | 11/2009 | Payne et al. | |
| 7,699,913 B2 * | 4/2010 | Grieve | A43B 17/102 252/194 |
| 8,539,692 B1 * | 9/2013 | Huebner | A42B 3/006 12/114.2 |
| 8,603,063 B2 * | 12/2013 | Grimm | B65D 1/0215 34/282 |
| 9,341,409 B1 * | 5/2016 | Akers | F26B 9/003 |
| 2006/0000837 A1 * | 1/2006 | Watson | B65D 1/18 220/521 |
| 2006/0236868 A1 | 10/2006 | Pansegrouw et al. | |
| 2008/0164265 A1 * | 7/2008 | Conforti | B65D 81/3823 220/592.2 |
| 2010/0152687 A1 * | 6/2010 | Carlozzi | A41B 9/04 604/359 |

(Continued)

FOREIGN PATENT DOCUMENTS

| | | |
|---|---|---|
| JP | 02229522 | 10/1988 |
| JP | 03169322 | 11/1989 |
| JP | 04006047 | 4/1990 |

(Continued)

*Primary Examiner* — Stephen M Gravini
(74) *Attorney, Agent, or Firm* — Welsh, Flaxman, & Gitler LLC

(57) ABSTRACT

A system and device for drying and deodorizing coolers includes a core layer including a desiccant and a deodorizer encased within a liquid resistant vapor barrier material. The device also includes a first super absorbent layer including a super absorbent polymer encased within a liquid permeable fabric.

10 Claims, 2 Drawing Sheets

(56) References Cited

U.S. PATENT DOCUMENTS

2018/0335241 A1* 11/2018 Li .............................. F25D 3/08

FOREIGN PATENT DOCUMENTS

| JP | 02229522 | 9/1990 | |
|---|---|---|---|
| JP | 04247213 | 2/1991 | |
| JP | 03169322 | 7/1991 | |
| JP | 04006047 | 1/1992 | |
| JP | 04247213 | 9/1992 | |
| JP | 07-061480 | 2/1993 | |
| JP | 07061480 | 7/1995 | |
| WO | WO-2009018412 A1 * | 2/2009 | ........... B65D 1/0215 |

* cited by examiner

DESICCANT AND DEODORIZING DEVICE

BACKGROUND OF THE INVENTION

1. Field of the Invention

The present invention generally relates to a device or pouch for use in maintaining coolers and other small enclosed spaces dry and odor free.

2. Description of the Related Art

As those who use coolers on a regular basis are familiar with, problems with regard to mold, mildew, and odor are commonly encountered when moisture sits within a closed cooler. For example, after a cooler is used it is normal for the owner to clean out the interior of the cooler and wash the interior walls (as well as the exterior walls). However, and after the interior of the cooler is fully cleaned, there is often moisture remaining along the interior walls thereof. If the cooler is closed before the interior of the cooler is fully dried, mold, mildew, and unwanted odors often follow and the user is confronted with a dirty cooler the next time he or she attempts to use the cooler.

As such, there is a need for a mechanism by which the user can be ensured his or her cooler is clean and ready for use each and every time he or she needs to take the cooler off-the-shelf. The present invention provides a pouch allowing for just that.

SUMMARY OF THE INVENTION

It is, therefore, an object of the present invention to provide a device for drying and deodorizing coolers. The pouch includes a core layer including a desiccant and a deodorizer encased within a liquid resistant vapor barrier material. The pouch also includes a first super absorbent layer including a super absorbent polymer encased within a liquid permeable fabric.

It is also an object of the present invention to provide a device wherein the device is in the form of a pouch.

It is another object of the present invention to provide a device wherein the desiccant and deodorizing member is a core layer, and the first liquid absorbent member is a first super absorbent layer adjacent the core layer.

It is a further object of the present invention to provide a device wherein the desiccant is silica desiccant.

It is also an object of the present invention to provide a device wherein the deodorizer is sodium bicarbonate.

It is another object of the present invention to provide a device wherein the liquid resistant, vapor permeable barrier material is a spun bound microporous fabric.

It is a further object of the present invention to provide a device including a cooler into which the pouch is placed.

It is also an object of the present invention to provide a device including a second liquid absorbent member having a super absorbent polymer encased within a liquid permeable fabric, the first liquid absorbent member being positioned along a top first surface of the desiccant and deodorizing member and the second liquid absorbent member being positioned along a bottom second surface of the desiccant and deodorizing member.

It is another object of the present invention to provide a device wherein the super absorbent polymer of the first liquid absorbent member is sodium polyacrylate and the super absorbent polymer of the second liquid absorbent member is sodium polyacrylate.

It is a further object of the present invention to provide a device wherein the liquid permeable fabric of the first liquid absorbent member is a polyester or polyethylene nonwoven liquid permeable fabric and the liquid permeable fabric of the second liquid absorbent member is a polyester or polyethylene nonwoven liquid permeable fabric.

It is also an object of the present invention to provide a method for drying and deodorizing coolers employing the device described above.

Other objects and advantages of the present invention will become apparent from the following detailed description when viewed in conjunction with the accompanying drawings, which set forth certain embodiments of the invention.

DESCRIPTION OF THE PREFERRED EMBODIMENT

Figure 1:
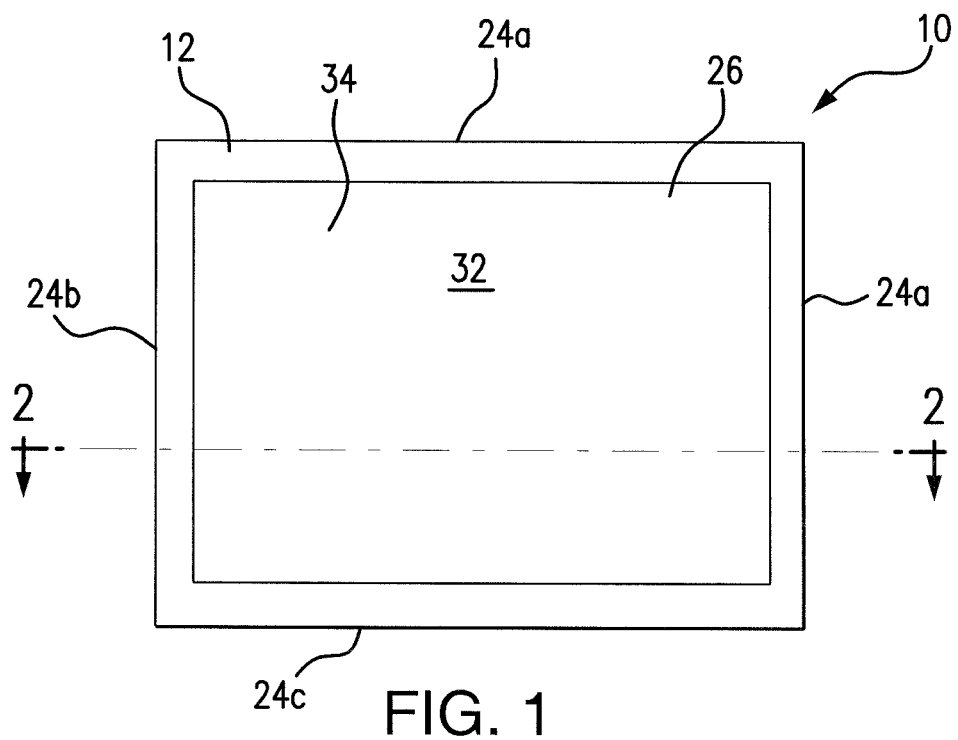
FIG. 1 is a top view of the pouch in accordance with the present invention.
Figure 2:
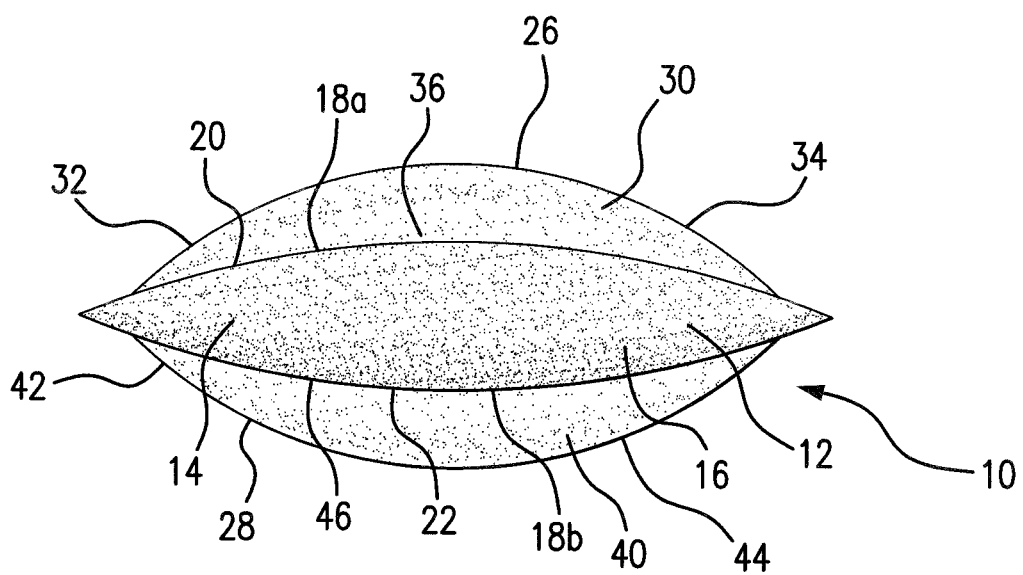
FIG. 2 is a cross sectional view along the line 2-2 in FIG. 1.
Figure 3:
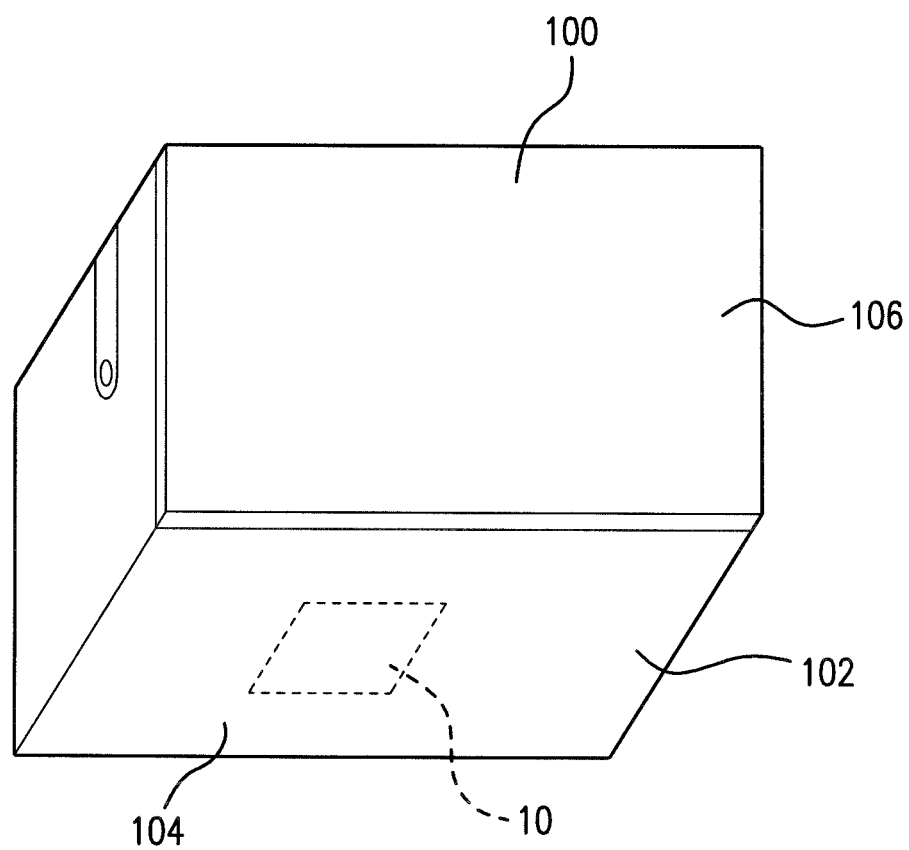
FIG. 3 is a perspective view of a cooler with the present pouch positioned therein.

A detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make and/or use the invention.

Referring to the various drawings, the present invention relates to a device in the form of a small pouch 10 that contains a food grade desiccant, a deodorizer, and water, or other liquid, absorbing material. As will be explained below in detail, the pouch 10 is made of water or liquid permeable materials and water vapor or liquid vapor permeable materials such that the pouch 10 can be placed in a closed cooler 100 after use to dry out the cooler and thereby prevent a moldy and musty smelling cooler. In accordance with a preferred embodiment, the pouch 10 will be approximately 4 inches in length, 3½ inches in width, and 0.125 inches in thickness. The pouch 10 may be used in conjunction with a variety of coolers 100. As those skilled in the art will appreciate, coolers 100 commonly include a plurality of insulated side walls 102 defining a cavity 104 in which articles may be placed. Coolers 100 also include a selectively openable mechanism, for example, a selectively openable cover 106. While an exemplary cooler is disclosed in accordance with the present disclosure, it should be appreciated coolers take a variety of forms and the pouch is intended for use therewith. While preferred dimensions are presented above, it is appreciated the dimensions may be varied depending upon the size of the cooler in which the pouch is intended to be used. In addition, it is appreciated different sizes of coolers may be used in accordance with the present invention, and these different sizes may be accommodated by making the pouches in different sizes or using multiple pouches in a cooler when necessary.

As used throughout the present disclosure, the term "water" is intended to refer to $H_2O$ in its liquid form and "liquid vapor" is intended to refer to the gas phase $H_2O$ and other substances that may accumulate in a cooler.

The pouch 10 includes a desiccant and deodorizing member in the form of a core layer 12 composed of silica desiccant 14 and sodium bicarbonate 16. The silica desiccant 14 functions as a drying agent and the sodium bicarbonate 16 functions to enhance deodorizing. The specific quantities of the silica desiccant 14 and the sodium bicarbonate 16 are determined based upon the desired characteristics of the pouch 10 and size of the enclosed space, such as a cooler 100, the pouch 10 is placed within.

The silica desiccant 14 and sodium bicarbonate 16 are contained within a liquid resistant, vapor permeable barrier material, in particular, a spun bound microporous fabric 18a, 18b that defines the top first surface 20 and the bottom second surface 22 of the core layer 12. As the silica desiccant 14 and the sodium bicarbonate 16 are generally granular, they are blended together and positioned between the top first surface 20 and the bottom second surface 22 of the core layer 12. While a spun bound microporous fabric is disclosed in accordance with a preferred embodiment, other liquid resistant, vapor permeable barrier materials maybe utilized in accordance with the present invention. The liquid resistant, vapor permeable barrier material used in accordance with the present invention is selected to prevent the passage of liquid therethrough, but allow for the passage of liquid vapor and other small elements, for example, odor causing elements. In this way, and as will be appreciated based upon the following disclosure, liquid vapor from the cooler 100 and odors from the cooler 100 may pass through the liquid resistant, vapor permeable barrier material and into the core layer 12 where they are captured by the silica desiccant 14 and sodium bicarbonate 16.

It is appreciated the silica desiccant 14 and the sodium bicarbonate 16 require protection from direct liquid contact, and the spun bound microporous fabric 18a, 18b that defines the top first surface 20 and the bottom second surface 22 of the core layer 12 protects the silica desiccant 14 and the sodium bicarbonate 16 from contacting water or other liquids while allowing water vapor or liquid vapor to pass therethrough and be adsorbed by the silica desiccant 14. The sodium bicarbonate 16 in the core layer 12 attracts odors that are traveling in the vapor.

In accordance with a preferred embodiment, the edges of the top first surface 20 and the bottom second surface 22 are held together via heat sealing technology so as to define the edges 24a-d of the core layer 12, and ultimately the pouch 10. While heat sealing is used in accordance with a preferred embodiment, it is appreciated other bonding techniques may be employed within the spirit of the present invention. With the foregoing in mind, the core layer 12 is structured with a rectangular shape and, therefore, includes outer peripheral edges 24a-d as well as the top first surface 20 and the bottom second surface 22 which meet at the outer peripheral edges 24a-d. While a specific shape and size for the pouch and the various layers is disclosed above, it is appreciated the shape may be varied to suit specific aesthetic needs, although it is important that the layering disclosed above be maintained.

Positioned respectively on top first surface 20 and the bottom second surface 22 of the core layer 12 are first and second liquid absorbent members in the form of an upper first super absorbent layer 26 and a lower second super absorbent layer 28. The upper first super absorbent layer 26 and the lower second super absorbent layer 28 are both rectangular shaped, although they are slightly smaller than the core layer 12. Considering first the upper first super absorbent layer 26 secured along the top first surface 20 of the core layer 12, it is composed of a super absorbent polymer 30 encased within a liquid permeable fabric 32 along the exterior first surface 34 of the upper first super absorbent layer 26 and the spun bound microporous fabric 18a defining both the top first surface 20 of the core layer 12 and the interior second surface 36 of the upper first super absorbent layer 26. The super absorbent polymer 30 functions to absorb water and other liquids that may remain within the cooler 100.

In accordance with a preferred embodiment, the super absorbent polymer 30 of the upper first super absorbent layer 26 is sodium polyacrylate. The sodium polyacrylate, in conjunction with the liquid permeable fabric 32 along the exterior first surface 34 of the upper first super absorbent layer 26 allow for direct water and/or fluid absorption by the super absorbent polymer 30 of the upper first super absorbent layer 26. The liquid permeable fabric 32 defining the exterior first surface 34 of the super absorbent layer 26 is preferably a polyester or polyethylene nonwoven liquid permeable fabric. As such, the super absorbent polymer 30, that is, the sodium polyacrylate, is positioned between the spun bound microporous fabric 18a defining the top first surface 20 of the core layer 12 (and the interior second surface 36 of the upper first super absorbent layer 26) and the polyester or polyethylene nonwoven liquid permeable fabric 32 that is secured over the super absorbent polymer 30.

Considering now the lower second super absorbent layer 28 secured along the bottom second surface 22 of the core layer 12, it is composed of a super absorbent polymer 40 encased within a liquid permeable fabric 42 along the exterior first surface 44 of the lower second super absorbent layer 28 and the spun bound microporous fabric 18b defining the bottom second surface 22 of the core layer 12 and the interior second surface 46 of the lower second super absorbent layer 28.

In accordance with a preferred embodiment, the super absorbent polymer 40 of the lower second super absorbent layer 28 is sodium polyacrylate. The sodium polyacrylate, in conjunction with the liquid permeable fabric 42 along the exterior first surface 44 of the lower second super absorbent layer 28 allow for direct liquid absorption by the upper super absorbent polymer 40 of the lower second super absorbent layer 28. The liquid permeable fabric 42 defining the exterior first surface 44 of the super absorbent layer 28 is preferably a polyester or polyethylene nonwoven liquid permeable fabric. As such, the super absorbent polymer 40, that is the sodium polyacrylate is positioned between the spun bound microporous fabric 18b defining the bottom second surface 22 of the core layer 12 (and the interior second surface 46 of the lower second super absorbent layer 28) and the polyester or polyethylene nonwoven liquid permeable fabric 42 that is secured over the super absorbent polymer 40.

While the super absorbent polymer used in accordance with the disclosed embodiment is sodium polyacrylate, it is appreciated other super absorbent materials are known and may be used without departing from the spirit of the present invention. As to the specific amount of the super absorbent polymer (or material) used in accordance with the present invention, it is determined by those skilled in the art based upon various design factors.

It is appreciated the upper first super absorbent layer 26 and lower second super absorbent layer 28 cover a substantial portion of the core layer 12. However, and considering the upper first super absorbent layer 26 and lower second super absorbent layer 28 are both covered with liquid permeable materials, the liquid vapor and odors may freely pass through the upper first super absorbent layer 26 and lower second super absorbent layer 28 and into the core layer 12 for absorption by the silica desiccant 14 and sodium bicarbonate 16.

It should be appreciated the pouch "fabrics", that is, the spun bound microporous fabric 18a, 18b and the liquid permeable fabric 32, 42 do not absorb anything. The liquid permeable fabric 32, 42 allows water or other liquids to pass therethrough, and the spun bound microporous fabric 18a, 18b allows only liquid vapor and other small particles to pass therethrough. The liquid absorbing material, that is, the liquid absorbing polymer 30, 40, is between both sides of the spun bound microporous fabric 18a, 18b and the liquid permeable fabric 32, 42, respectively. This allows for the pouch 10 to be tossed into a cooler 100 and work properly no matter how it lays in the cooler 100.

Although specific fabrics are disclosed above for use in accordance with the present invention, it is appreciated other fabrics exhibiting similar permeability characteristics may be used. Ultimately, the fabrics selected will exhibit desirable permeability characteristics while retaining the silica desiccant/sodium bicarbonate or super absorbent polymer therebetween. For example, as the super absorbent polymer material absorbs liquid, it greatly expands. The super absorbent polymer will expand to such an extent that the pouch will begin to bulge and the fabric(s) selected must not allow the saturated super absorbent polymer to ooze out of the pores therein.

As briefly mentioned above, it should be noted that the periphery of the core layer 12 extends beyond the upper first super absorbent layer 26 and the lower second super absorbent layer 28 so as to define an exposed perimeter surface 12p of the core layer 12. However, the core layer 12 can be the same size as the upper first super absorbent layer 26 and the lower second super absorbent layer 28. As such, the spun bound microporous fabric 18a, 18b and the liquid permeable fabric 32, 42 could all be sealed together along their respective.

Use of the present pouch 10 takes place in the following manner. After the cooler 100 has been used and cleaned out, the cooler 100 is opened and the pouch 10 is placed therein. Thereafter, the cooler 100 is sealed shut and the pouch 10 absorbs vapors, undesirable odors, and liquid remaining within thin the cooler 100. When it is time, to use the cooler 100 again, the pouch 10 is removed and discarded, and the cooler 100 is filled as desired.

While the preferred embodiments have been shown and described, it will be understood that there is no intent to limit the invention by such disclosure, but rather, it is intended to cover all modifications and alternate constructions falling within the spirit and scope of the invention.

The invention claimed is:

1. A device for drying and deodorizing coolers, comprising:
   a desiccant and deodorizing core member including a desiccant and a deodorizer encased within a liquid resistant, vapor permeable spun bound microporous fabric barrier material; and
   a first liquid absorbent member including a super absorbent polymer encased within a liquid permeable fabric and a second liquid absorbent member including a super absorbent polymer encased within a liquid permeable fabric, the first liquid absorbent member being positioned along a top first surface of the core desiccant and deodorizing member and the second liquid absorbent member being positioned along a bottom second surface of the core desiccant and deodorizing member.

2. The device according to claim 1, wherein the device is in the form of a pouch.

3. The device according to claim 1, wherein the desiccant is silica desiccant.

4. The device according to claim 1, wherein the deodorizer is sodium bicarbonate.

5. The device according to claim 1, wherein the super absorbent polymer is sodium polyacrylate.

6. The device according to claim 1, wherein the liquid permeable fabric is a polyester or polyethylene nonwoven liquid permeable fabric.

7. The device according to claim 1, further including a cooler into which the pouch is placed.

8. The device according to claim 1, wherein the liquid permeable fabric of the first liquid absorbent member is a polyester or polyethylene nonwoven liquid permeable fabric and the liquid permeable fabric of the second liquid absorbent member is a polyester or polyethylene nonwoven liquid permeable fabric.

9. The device according to claim 8, further including a cooler into which the pouch is placed.

10. A system for drying and deodorizing a cooler, comprising:
    a drying and deodorizing device, the drying and deodorizing device including:
       a core layer including a desiccant and a deodorizer encased within a liquid resistant, vapor permeable barrier material;
       a first liquid absorbent member including a super absorbent polymer encased within a liquid permeable fabric; and
       a second liquid absorbent member including a super absorbent polymer encased within a liquid permeable fabric, the first liquid absorbent member being positioned along a top first surface of the core layer and the second liquid absorbent member being positioned along a bottom second surface of the core layer,
    the drying and deodorizing device adapted for placement within the cooler, wherein the drying and deodorizing device absorbs vapors, undesirable odors, and any liquid remaining within the cooler.

\* \* \* \* \*